US012025985B2

(12) United States Patent
Van De Velde et al.

(10) Patent No.: US 12,025,985 B2
(45) Date of Patent: Jul. 2, 2024

(54) METHODS AND APPARATUS FOR COORDINATING AUTONOMOUS VEHICLES USING MACHINE LEARNING

(71) Applicant: Drobot, Inc., Greenville, SC (US)

(72) Inventors: Stijn J Van De Velde, Simpsonville, SC (US); Ankit R Verma, Greenville, SC (US); Siddhesh N Bagkar, Troy, MI (US); Joseph M Etris, Simpsonville, SC (US); Shaurya Panthri, Troy, MI (US); Chinmay Rathod, Troy, MI (US)

(73) Assignee: Drobot, Inc., Greenville, SC (US)

( * ) Notice: Subject to any disclaimer, the term of this patent is extended or adjusted under 35 U.S.C. 154(b) by 0 days.

(21) Appl. No.: 17/826,104

(22) Filed: May 26, 2022

(65) Prior Publication Data
US 2022/0382287 A1    Dec. 1, 2022

Related U.S. Application Data

(60) Provisional application No. 63/249,769, filed on Sep. 29, 2021, provisional application No. 63/193,580, filed on May 26, 2021.

(51) Int. Cl.
*G05D 1/00*  (2024.01)
*H04W 4/40*  (2018.01)

(52) U.S. Cl.
CPC .........  *G05D 1/0214* (2013.01); *G05D 1/0022* (2013.01); *G05D 1/0027* (2013.01);
(Continued)

(58) Field of Classification Search
CPC .. G05D 1/0214; G05D 1/0022; G05D 1/0027; G05D 1/0044; G05D 1/028; G05D 1/0289; H04W 4/40
See application file for complete search history.

(56) References Cited

U.S. PATENT DOCUMENTS

| 7,418,342 B1 * | 8/2008 | Bell .................... G01C 21/3617 701/487 |
| 2003/0001390 A1 * | 1/2003 | Phillips ................. B60W 10/06 290/40 C |

(Continued)

FOREIGN PATENT DOCUMENTS

| CN | 110333718 A * | 10/2019 | |
| WO | WO-2021046026 A1 * | 3/2021 | ........... G08G 5/0013 |
| WO | WO-2021177887 A1 * | 9/2021 | |

OTHER PUBLICATIONS

English Translation of CN 110333718 A.*

*Primary Examiner* — Rami Khatib
*Assistant Examiner* — Shahira Baajour
(74) *Attorney, Agent, or Firm* — Tracnik Law PLLC; Joseph P. Kincart

(57) ABSTRACT

Apparatus and methods for controlling a path of an autonomous mobile device based upon defining a series of origination positions and destination positions, each destination position correlating with position coordinates. A current position of an autonomous vehicle is determined via location automation such as real time communication systems and an approved pathway is generated to guide the autonomous vehicle. The position coordinates may be a set of values that accurately define a position in two dimensional 2D or three-dimensional (3D) space. Position coordinates may include cartesian coordinates.

18 Claims, 7 Drawing Sheets

(52) U.S. Cl.
CPC ........... *G05D 1/0044* (2013.01); *G05D 1/028* (2013.01); *G05D 1/0289* (2013.01); *H04W 4/40* (2018.02)

(56) References Cited

U.S. PATENT DOCUMENTS

| | | | | |
|---|---|---|---|---|
| 2014/0371973 | A1* | 12/2014 | Pfaff | G05D 1/0088 901/9 |
| 2016/0318531 | A1* | 11/2016 | Johnson | B61L 25/02 |
| 2020/0041601 | A1* | 2/2020 | Ko | B25J 5/007 |

* cited by examiner

METHODS AND APPARATUS FOR COORDINATING AUTONOMOUS VEHICLES USING MACHINE LEARNING

RELATED APPLICATIONS

This application claims priority to U.S. Provisional Patent Application 63/249,769, filed Sep. 29, 2021, and U.S. Provisional Patent Application 63/193,580, filed May 26, 2021, both of which are incorporated herein by reference in their entirety.

FIELD OF THE DISCLOSURE

The present disclosure relates to apparatus and methods to control navigation and operation of an autonomous vehicle or person through a complex environment. More specifically, the present invention provides apparatus and methods for controlling a sequence of origination positions and destination positions, combined with acceptable acceleration, velocity, and action operation, such that the operation and travel of an autonomous vehicle or a person through a sequence of positions and actions is safe and efficient.

BACKGROUND OF THE DISCLOSURE

The operation of robots and other autonomous vehicles is growing significantly in many environments. There is a need to guide the autonomous vehicles or persons (VOPs) safely and efficiently along approved paths that avoid obstacles and areas less desirable for travel.

In current applications, Tag and therefore Vehicle location are typically determined locally by or on the Vehicle itself, and Vehicles only know their own position—not the position of any other VOPs in their vicinity.

Other approaches use electronic sensors such as vision cameras and LiDAR. Unfortunately, autonomous vehicles using these types of sensors still require significant time and effort for programming or "training", in order to make them follow a required route, and such training is vulnerable to changes in the environment. Therefore, flexibility and reliability remain a concern. These methods also require significant computing power, resulting in the need for larger batteries and ultimately affecting the operating range of the autonomous vehicles. RTLS has been used for individual location tracking by a vehicle itself, but such systems lack awareness of other vehicles and/or persons in the environment and are therefore inefficient and sometimes dangerous.

SUMMARY OF THE DISCLOSURE

Accordingly, the present invention provides apparatus and methods for defining a series of origination positions and destination positions, each destination position correlating with position coordinates. The position coordinates may be a set of values that accurately define a position in two dimensional 2D or three-dimensional (3D) space. Position coordinates may include by way of non-limiting example one or more of: cartesian coordinates, polar coordinates, and cylindrical coordinates.

The present invention provides for determination of a current position definable via the positional coordinates via wireless communications. Preferred wireless communications are performed via an ultrawideband communication modality. Other communication modalities may include, for example, Bluetooth, WiFi, infrared, cellular and global positioning systems (GPS).

As described herein, in some embodiments, a series of positional coordinates are defined in sequence. A trajectory is generated to guide a robot from a current position to a next destination point. On a periodic basis, wireless communications are utilized to calculate a current position, the trajectory may be updated following determination of each current position, or upon reaching some set value, or minimum set value of current position calculations.

Embodiments of the present disclosure may include a method of controlling movement of an autonomous vehicle, the method including. Embodiments may also include with a controller, generating a sequence of waypoints including a virtually approved pathway for a first autonomous vehicle in an environment. Embodiments may also include determining a current position P of the first autonomous vehicle at a time T based upon a wireless communication C between a transceiver tag collocated with the first autonomous vehicle and ultrawideband anchors located at known locations relative to the origin point during the wireless communication.

Some embodiments of the present invention may additionally include determining a direction and distance from the current position of the first autonomous vehicle to a next waypoint P+1 of the plurality of the sequence of positions. Embodiments may also include with a controller, issuing control commands for cause the first autonomous vehicle to be operative to travel in the direction and distance towards the next waypoint P+1.

Some embodiments of the present invention may additionally move the first autonomous vehicle in the environment based upon the control commands. Embodiments may also include determining that the first autonomous vehicle has arrived at a location within a tolerance to waypoint P+1. Embodiments may also include determining a set of coordinates descriptive of the location of the first autonomous vehicle within a tolerance to waypoint P+1 at second time T2 based upon a sequential wireless communication C+1 between a transceiver collocated with the first autonomous vehicle and ultrawideband anchors located at known locations relative to the origin point during the wireless communication. Embodiments may also include repeating steps b. through g. until determining that the first autonomous vehicle has arrived to a position within a tolerance to the destination position.

Some embodiments of the present invention may additionally at least one of the wireless communications C and C+1 may include transceiving using an ultrawideband modality. In some embodiments, the method may additionally include the step of generating a user interface on a user interactive display, the user interface including a representation of the environment and a virtual approved pathway including at least some of the waypoints.

Some embodiments of the present invention may additionally include generating respective sets of coordinates for the waypoints that make up the virtual approved pathway and charting a trajectory of the first autonomous vehicle, the trajectory may specify a route of travel based upon the virtually approved pathway, and one or both of: a velocity of the first autonomous vehicle, and an acceleration of the first autonomous vehicle.

Embodiments may also include generation of one or both of: a velocity of the first autonomous vehicle, and an acceleration of the first autonomous vehicle which may be calculated with reference to the respective times T.

It may also be determined that a first autonomous vehicle may collide with an item if the trajectory is followed. A potential collision may involve a second autonomous vehicle travelling in the environment and a control command may be transmitted from the controller to one or both of the first autonomous vehicle and the second autonomous vehicle to modify a rate of travel sufficiently to avoid collision, such as via stopping, accelerating, or decelerating; or change a direction of travel, such as, by modifying one or more waypoints.

In some embodiments, a sensor may be operational to generate and transmit data quantifying a condition at the sensor location within the environment to the controller and a waypoint may be modified based upon the sensor data and/or a control command may be transmitted from the controller to an autonomous vehicle causing the autonomous vehicle to be operative to perform one or more of acceleration, deceleration, and stopping.

Still further, in some embodiments, as destination may include a mobile target a destination position may be modified to correlate with a location of a mobile target. In some embodiments, waypoints may also be modified based upon a modified destination position.

BRIEF DESCRIPTION OF THE DRAWINGS

The accompanying drawings, which are incorporated in and constitute a part of this specification, illustrate several embodiments of the disclosure and, together with the description, serve to explain the principles of the disclosure.

DETAILED DESCRIPTION

Figure 1A:
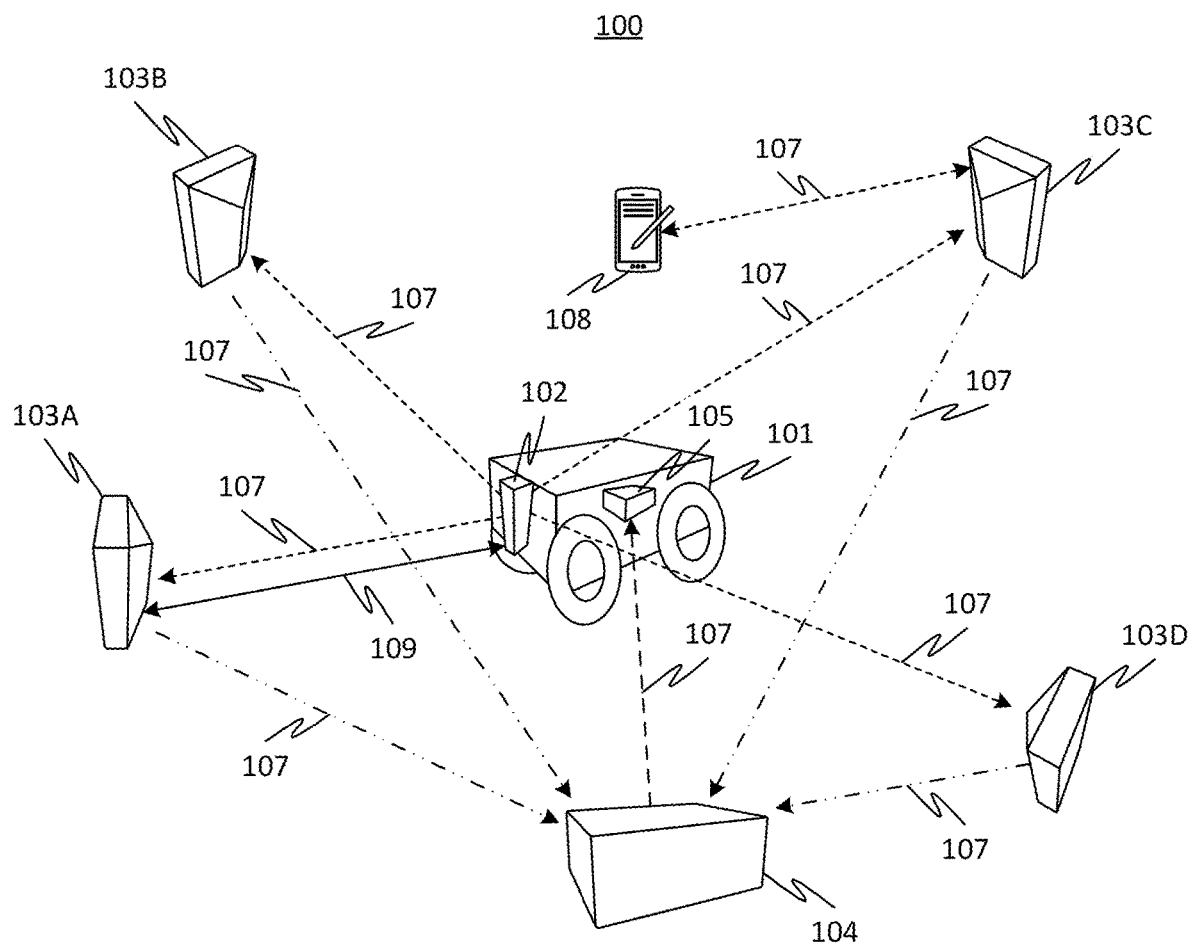
FIG. 1A illustrates an exemplary embodiment of the invention with a Vehicle co-located with a Tag that communicates with Anchors.

The present invention provides apparatus and methods for improved navigation of an autonomous vehicle or person ("VOP") through an environment within range of a RTLS transmission. More specifically, the present invention provides apparatus and methods for controlling a sequence of origination positions and destination positions, combined with acceptable acceleration and velocity, such that the travelling through the sequence of positions allows an autonomous vehicle to navigate to a destination via a safe and efficient process.

The VOP is instructed to mobilize from a current position to a next destination position. The current position and next position are associated with a set of positional coordinates. Positional coordinates may also have an acceptable tolerance such that if the robot is positioned proximate to a set of positional coordinates, a controller issuing mobilization commands will consider the robot to have reached a destination.

According to the present invention, vehicles, such as Automated Guided Vehicles ("AGV"s), Autonomous Mobile Robots ("AMR"s) and Autonomous Aerial Vehicles (sometimes referred to as "AAV"s or "drones") and/or person (collectively referred to as a "VOP"), may be operated in complex real-world environments such as manufacturing shopfloors, warehouses, and hospitals via commands transmitted via ongoing wireless communications, such as a Real-Time Locating System (RTLS), typically consisting of Anchors, Tags, a Positioning Server, and local area network ("LAN") equipment. Tags and Anchors exchange radiofrequency (RF) signals, making it possible to calculate a position of one or more of: a Tag, and an Anchor. Position calculations may be performed by one or more processors executing software. The processors and software may be located in one or more of: a Tag, an anchor, and a Positioning Server. Tags may be attached or otherwise collocated with an Asset such as, one or more of a: material, parts, tool, equipment, AGV, AAV, AMR, or person. By calculating a position of a Tag, a position of an associated Asset may be derived.

Tracking of one or more of: positions, velocity, acceleration, deceleration, altitude, and proximate obstacles over time, machine learning may be used to accurately predict future values of similar travel variables (e.g., positions, velocity, acceleration, deceleration, altitude, and proximate obstacles). In some embodiments, travel variables may be combined with Asset Variables descriptive of an Asset associated with the Tag to predict one or more actions that involve the Asset being tracked.

The present invention provides RTLS coordinates to a central Positioning Server via a Wireless Datalink (which may be secure), to provide positioning and movement data of multiple autonomous Vehicles and/or persons within a specified range and operating in a same environment, to coordinate activities in the environment, and safely and efficiently control respective positions such that the vehicles and/or persons do not collide or interfere with each other.

Some embodiments additionally include drawing on a smart device (or other controller interface) a travel path to be traversed by a vehicle and/or person, the path will preferably be integrated with a 2D or 3D representation of an environment. The travel path may be transcribed into a series of multiple destination points. Unlike previously known control systems, a series of origination positions interior to a building may be calculated via UWB communications (or other wireless communications) between a transceiver (which may be a "Tag") collocated with a vehicle, person and/or robot, and transceivers located at known reference points ("Anchors"). In addition, in some embodiments, the present invention provides for handoff of UWB communications between the Tag and sets of multiple disparate Anchors, each Anchor coordinated with a known.

In the following sections, detailed descriptions of examples and methods of the disclosure will be given. The description of both preferred and alternative examples though thorough, are exemplary only, and variations, modifications, and alterations may be apparent to those skilled in the art. It is therefore to be understood that the examples do not limit the broadness of the aspects of the underlying disclosure as defined by the claims.

In some embodiments, a position may be determined based upon RTLS data, such as timing data and/or signal direction data. The RTLS data may generated via wireless communication between a Tag and two or more Anchors, and preferably three or more Anchors. RTLS communication positioning may be augmented via additional modalities offering diverse methods and apparatus for determining a position of the robot such as accelerometers, infrared sensors, LiDAR, SLAM, image recognition, and the like. In some embodiments, a controller may operate according to a hierarchy of position determining modalities. For example, a controller may place UWB positioning as a highest prioritized modality and image recognition as a lower priority positioning modality.

A positioning server, or other controller defines a series of origination positions and destination positions, each destination position correlating with position coordinates. Control commands are provided to the VOP to cause the robot to propel itself to each successive destination position based upon a current location of the VOP and direction the VOP is facing.

Position coordinates may be a set of values that accurately define a position in two dimensional 2D or three-dimensional (3D) space. Position coordinates may include by way of non-limiting example one or more of: cartesian coordinates (e.g., X, Y, Z), polar coordinates (e.g.; angle and distance), and cylindrical coordinates (e.g.; angle, distance and height).

The present invention provides for determination of a current position definable via the positional coordinates via wireless communications. Preferred wireless communications are performed via an ultrawideband communication modality. Other communication modalities may include, for example, Bluetooth, WiFi, infrared, cellular and global positioning systems (GPS).

As described herein, in some embodiments, a series of positional coordinates are defined in sequence. A trajectory is generated to guide a VOP from a current position to a next destination point. On a periodic basis, wireless communications are utilized to calculate a current position, the trajectory may be updated following determination of each current position, or upon reaching some set value, or minimum set value of current position calculations. A controller delivers control commands, such as, for example, digital command or analog power) to the VOP to cause the VOP to traverse from a current position to a next destination position.

Some embodiments additionally include drawing a path on a smart device or other controller interface, the path may overlay a 2D or 3D representation of an environment. The path may be transcribed into a series of multiple destination points. Unlike previously known control systems, a series of origination positions interior to a building may be calculated via UWB communications (or other wireless communications) between a transceiver collocated with the VOP (sometimes referred to herein as a "Tag") and transceivers located at know reference points ("Anchors"). In addition, the present invention provides for handoff of UWB communications between the Tag and sets of multiple disparate Anchors, each anchor coordinated with a single origination point from which positional coordinates may be calculated.

In the following sections, detailed descriptions of examples and methods of the disclosure will be given. The description of both preferred and alternative examples though through are exemplary only, and it is understood that to those skilled in the art that variations, modifications, and alterations may be apparent. It is therefore to be understood that the examples do not limit the broadness of the aspects of the underlying disclosure as defined by the claims.

Glossary

"Anchor" as used herein shall mean a wireless transceiver located at a known position relative to an environment containing a VOP.

"Approved" shall mean a (class of) mobile robot(s) is allowed to use the pathway (under certain circumstances) to accomplish certain objectives.

"Autonomously" as used herein, shall mean inclusive of propulsion and directional mechanisms required to traverse a physical environment.

"Autonomous Vehicle or Person" (sometimes referred to as a "VOP") as used herein shall mean one or more of an unmanned vehicle, unmanned robot, or a person collocated with a positioning tag.

"Autonomous Vehicle System" as used herein shall mean apparatus and executable code enabling wireless positioning of an VOP.

"Bot" as used herein shall mean mobile robot.

"Environment" as used herein shall mean an area that is one or more of: defined, delimited, and demarcated area; in which a mobile robot operates among other objects and people.

"Floor plan" as used herein shall mean a visual (2D) representation of the environment (including any fixed obstacles, such as walls, doors, equipment, etc. and including any existing pedestrian or other aisleways).

"Intersection points" as used herein shall mean a location where 2 pathways intersect.

"Location" as used herein shall mean a specific place (position) in the environment (defined by a 2D or 3D coordinate).

"Mobile Robot" (sometimes referred herein as an AMR or "BOT") as used herein, shall mean a vehicle and/or automation capable of traversing through a physical environment, a robot may also include physical and/or logical capabilities.

"Mobile Robot Pathway" (sometimes referred to as an MRP) shall mean a defined path or trajectory in three-dimensional space that is suitable for use by a Mobile Robot to navigate through a Physical Environment, it should be noted that a MRP may include one or more variables of constant value, e.g., XY and/or Z remain constant.

"Path point" ("waypoint"?) as used herein shall mean any start or finish or inflection point along a pathway; a specific location within the environment, used to define a pathway or station (path points are usually defined by POSE; see http://wiki.ros.org/geometry_msgs).

"Pathway" as used herein shall mean any combination of approved paths; a set of path points that a particular (class of) mobile robot(s) is allowed to travel under certain/specific circumstances (in order to complete a certain/specific task or achieve a certain/specific objective).

"Physical Environment" shall mean a defined, delimited, and demarcated area; in the real world (as opposed to a Virtual world).

"Position" as used herein shall mean a point in space definable via a set of coordinates.

"Real Time Locating System" ("RTLS") shall mean apparatus and software enabling real time calculation of a position of a transceiver based upon radio communications. Radio communications may include, for example, one or more of: ultra-wideband, Bluetooth, Wi-Fi, GNSS, global positioning system, ultrasonic, infrared communications software and hardware.

"Tag as used herein shall mean a wireless transceiver collocated with a VOP, material, container, part, pallet, equipment, or other item.

"Virtual" shall mean an item stored in a computer system, which may or may not be visible in User Interface (UI) and may or may not match a physical item in a Physical Environment.

"Virtual Approved Pathway" as used herein shall refer to "Virtual Environment" shall mean an Environment defined in a computer system, which may or may not be visible in User Interface (UI) and may or may not match a Physical Environment.

"Vehicle" as used herein refers to automation capable of traveling in an environment.

"Wireless Datalink" as used herein refers to devices and methods of communication without a hardwired connection between the communication points. Communication protocols used in a Wireless Datalink may include one or more of: Ultra-wideband (UWB), Wi-Fi, Bluetooth, LoRa, infrared and ultrasonic energy bands.

Referring now to FIG. 1A, the present invention provides an Autonomous Vehicle System 100 that includes one or more Taus 102 co-located with a VOP 101 and in communication via a Wireless DataLink 107 with a Positioning Server 104. The Tag 102 communicates with one or more Anchors 103 and positioning servers 104 via a Wireless Datalink 107 within a Physical Environment 110. The Wireless Datalink 107 communications may include timing signals, position data, movement instructions (e.g., acceleration, velocity, direction) origination points, destination points, or other information related to travel of a VOP 101 through a Physical Environment 110.

According to the present invention, one or more of: current position coordinates, destination position coordinates and final destination coordinates may be generated as part of a sequence of positional coordinates to be travelled by the VOP 101. The position coordinates may be generated, by way of non-limiting example, via execution of software commands by a controller that receives values for timing variables involved in the Wireless Datalink communications and performs location determining algorithms, such as one or both of trilateration and triangulation. Some preferred embodiments include a processor operative to execute method steps via executable software to perform time difference of arrival (TDOA) protocols on respective wireless communications between a Tag 102 and a first Anchor 103, a second Anchor 103, and a third Anchor 103C, or other Anchor 103D to determine a respective distance 109, such as, for example: between the Tag 102 and the first Anchor 103, the second Anchor 103, and the third Anchor 103C, or other Anchor 103D. With three or more respective distances 109 between the Tag 102 and an Anchor 103A-103D, one or both of triangulation and trilateration may be used to generate position coordinates for the Tag 102. Position coordinates may include, for example, X,Y, Z Cartesian coordinates. A controller generating the position coordinates may be associated with one or more of an autonomous vehicle, a Tag 102, a Positioning Server 104, a Smart Device 108, or other apparatus or device with a processor and memory (as described more fully below).

Position coordinates are preferably generated on a periodic basis, such as once every 0.1 seconds or once every 2 seconds, depending upon particular circumstances. For example, a slow moving VOP 101 may have a longer period of time between generation of new position coordinates, which may conserve battery life and bandwidth, and a faster moving VOP 101 may have a shorter period of time between determination of position coordinates. In some embodiments, a period of time between generation of a position coordinates may be based upon a projected and/or calculated velocity and/or acceleration of a VOP 101, so that for example if a VOP is stationary, a period of time between generation of position coordinates may be two seconds or more, and if a VOP is moving quickly, a period of time between generation of position coordinates may be one tenth (0.1) of a second.

Figure 1B:
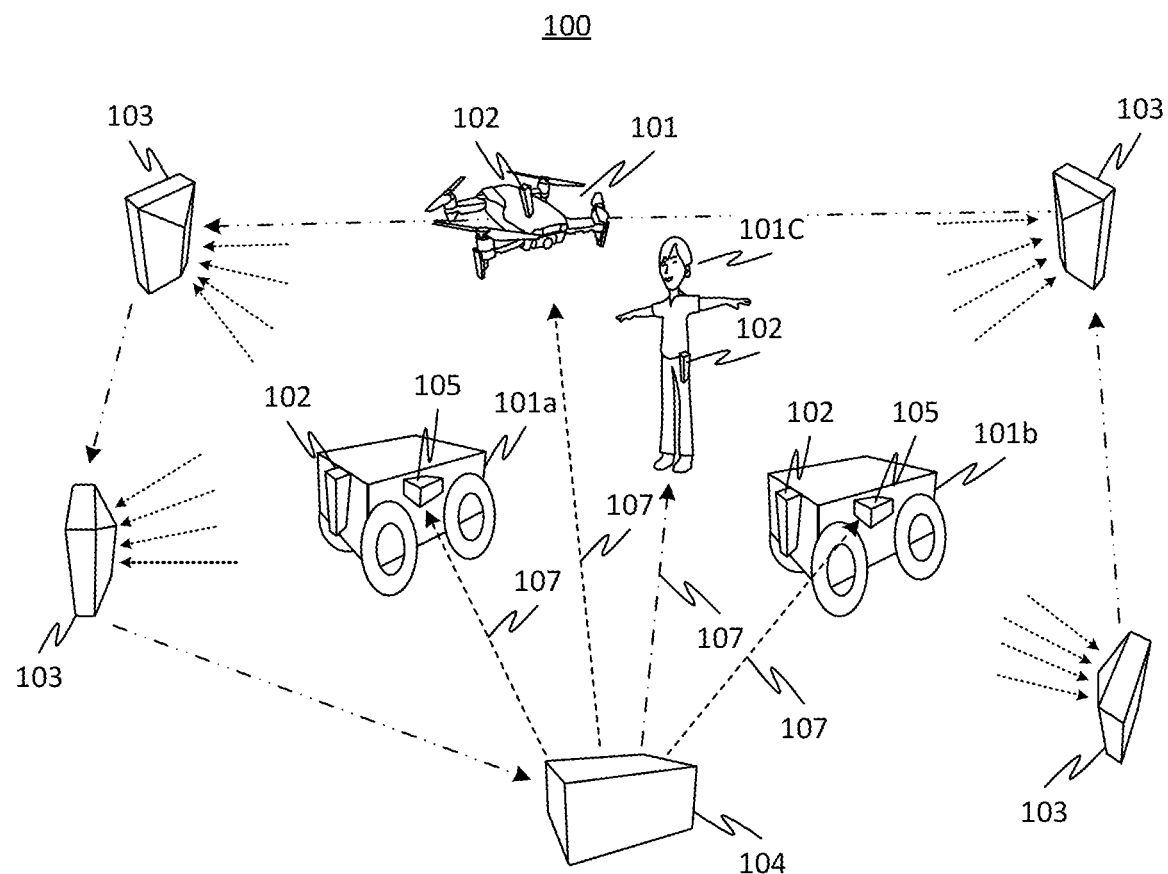
FIG. 1B illustrates an exemplary embodiment of the invention with multiple unmanned vehicles and a person co-located with respective Tags that communicate with Anchors.

Referring now to FIG. 1B, multiple disparate VOPs 101a, 101b, 101c, 101d are illustrated. Each VOP 101a, 101b, 101c is collocated with a respective Tag 102. As illustrates, the VOPs may include one or more of: an unmanned vehicle 101a-b, a person 101c, and a drone 101d. By determining a location of a collocated Tag 102, a location of a VOP 101a, 101b, 101c, 101d may be inferred (as being the same as the collocated Tag 102).

Figure 1C:
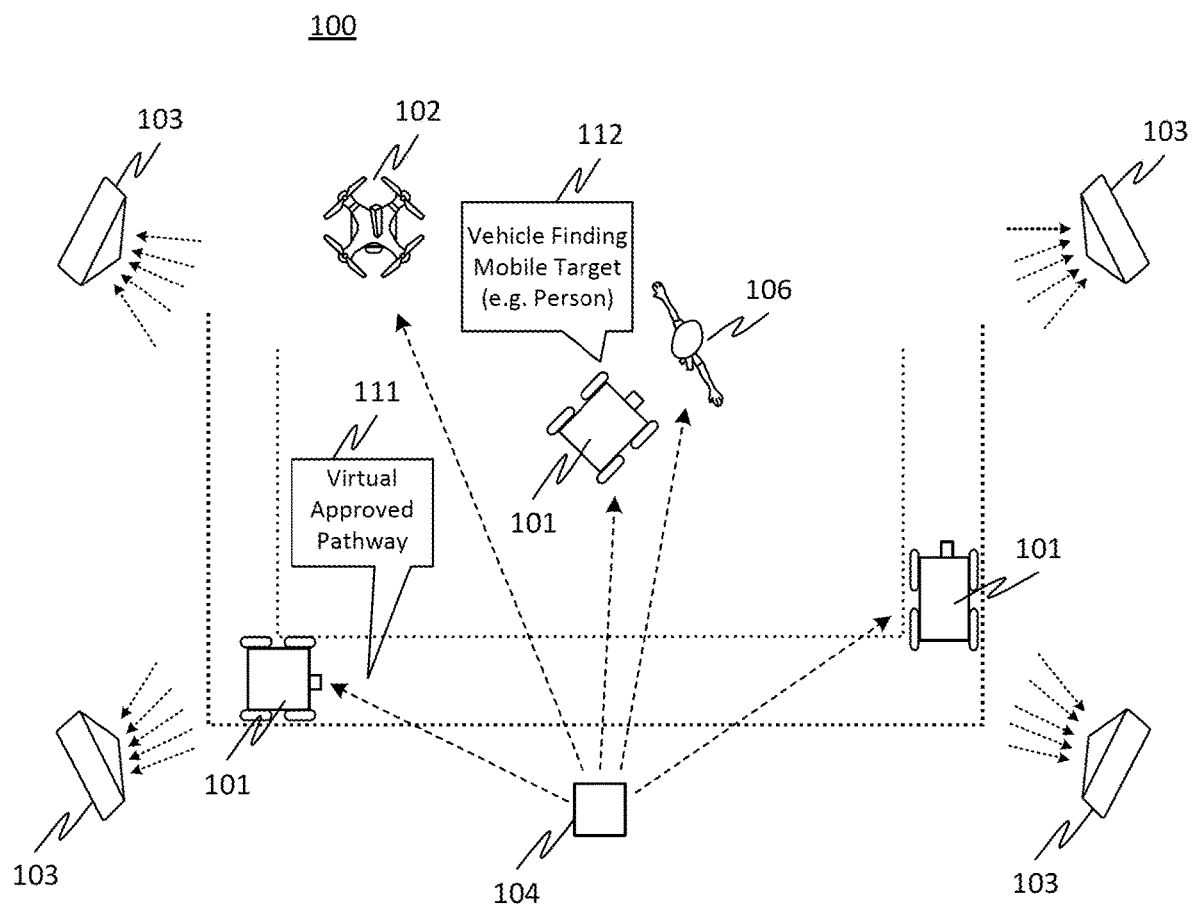
FIG. 1C illustrates an exemplary embodiment of the invention with virtual approved paths for multiple vehicles and a mobile target.

Referring now to FIG. 1C, the present invention enables a controller, such as a controller included in a VOP 101a, 101b, 101c or a Positioning Server 104 to generate a prescribed travel route comprising a series of current location point coordinates and destination point coordinates. A VOP 101a, 101b, 101c may report current location point coordinates to a positioning server (or other controller) and receive destination point coordinates for a next destination according to a periodic basis and/or upon a threshold event. A threshold may be almost any quantifiable condition related to a VOP position and/or conditions within an environment.

Some exemplary threshold events may include, one or more of: reaching a position proximate to a destination point; traveling a prescribed distance; remaining stationary for a prescribed period of time (dwell time); a travel trajectory of another VOP 101; a travel trajectory that will collide with an obstruction; or other event that may be a condition precedent to a change in one or more of; a set of destination coordinates (which may correlate with a next destination, or a subsequent destination); a velocity of travel of the VOP 101; an acceleration rate of the VOP 101; a deceleration rate of the VOP 101; a rate of change of direction included in a travel trajectory; reaching a maximum number of VOPs within a given set of position coordinates defining an area; experiencing a disrupting event within a given set of position coordinates defining an area (e.g. a spill, hazard or other adverse condition), and a pause (or other delay) of travel.

Referring now to FIG. 1C, in some embodiments, a Virtual Approved Pathway ("VAP") 111 may be generated by a controller and set forth a series of destination position coordinates. A VOP 101 will be transmitted travel instructions that instruct the VOP 101 to proceed from one destination position coordinate to another. In some embodiments, a wayfaring tolerance may be included in the travel instructions. Wayfaring tolerance will include an acceptable variance to achieve "arrival" at a destination position coordinate. A tolerance may be a unit of distance measurement (e.g., within one meter) or a quantity of a numerical designation for position coordinates (e.g., within 10 units).

Some embodiments will include a VAP 111 that guides a VOP 101 from a first position (which may optionally be defined by coordinates) to a second position, sometimes referred to as a destination position (also definable via position coordinates) that is generally a fixed position.

Embodiments may also include an instruction for a VAP 111 to be periodically regenerated to reflect a changing position of a mobile target 106. Embodiments that include a Mobile Target 106 as a destination position may periodically monitor one or more of a mobile target's position at a time "T" and adjust a destination point to be synonymous with the mobile target's position at time T. Alternatively, a trajectory of a Mobile target 106 may be calculated such that the VOP 101 may be programmed to intersect that trajectory of the Mobile target 106. The Mobile target 106 trajectory may be calculated for example by consideration of one or more of the: velocity, acceleration, and deceleration of the Mobile Target; obstructions in the path of the Mobile target 106, restricted areas in the path of the Mobile target 106, hazardous areas, or other condition that may impair travel of a VOP.

In some embodiments, a digital message may be transmitted to a smart device or other user device indicating the arrival of a VOP at a prescribed destination within a margin of error indicated by a tolerance.

In some embodiments, precise real-time location of VOPs 101 within a same physical space—is calculated on a central Positioning Server 104. The Positioning Server 104 may then transmit location information to automation, vehicles and persons involved, such as, via a Wireless Datalink. This allows each VOP 101 as well as other person and/or automation to know a real-time position of each VOP 101. It also allows for a Positioning Server 104 or other controller to modify travel trajectories and/or other behavior of VOPs (e.g., slow down) based on the VOPs 101 calculated location and/or trajectory within the environment (e.g., shopfloor) and based on its relative position compared to any other Vehicles and People in its vicinity.

The present invention enables coordinated control of the behavior of autonomous Vehicles or VOPs 101 in real time, remotely, and in a centralized fashion, simply by modifying settings (e.g., the maximum allowed speed) or by defining a VAP 111 (e.g., new routes, new approved pathways, or new geofenced areas).

Embodiments that utilize a Central Positioning Server 104 to perform a significant amount of calculations enables drastic reduction in an amount of on-board computation needed on a VOP, which in turn one or more of smaller onboard batteries and/or longer operating ranges.

Some preferred embodiments include generating a VAP 111 via one or more of: using a GUI; define individual path points (clicking with mouse or tapping with finger on a user interface); draw pathway (drawing with mouse or finger on a user interface); a controller identifies relevant path points along a defined pathway; path points stored in memory as a representation of pathway; way point logger algorithms; acceptable destination variance;
identification of intersections of a new VAP 111 with known pathways stored in memory; hierarchical priorities of which VAP 111 will receive a right of way; and other travel related logistics; using a RTLS (e.g., UWB, WiFi, Bluetooth) Tag 102; and moving a Tag 102 along a certain trajectory, while recording positional coordinates, thus defining an approved pathway which can be edited at a subsequent time.

In various embodiments, a controller (such as a Positioning Server 104) may also provide functionality for one or more of: smoothen trajectories (e.g. to comply with desired travel conditions); highlight portions of trajectories that are not feasible for specific (classes of) VOPs due to geometric limitations of the vehicle (e.g., too sharp turn for VOP's turning radius) and/or under certain circumstances (e.g., meant to carry a wide load); create an initial trajectory which may be manually modified; auto-suggest corrections which may be accepted by a user, operator, and/or administrator; auto-adjust/auto-smoothen/auto-correct, trajectories to create feasible pathways (possibly different for different classes of VOPs, based on a particular steering mechanisms, such as skid steering vs. front wheel steering, such as Ackermann steering).

Some embodiments include optimizing a VAP 111, such as via providing a smooth transition from one destination position to a next destination position, such as via one or both of: by smoothening the VAP 111; and by anticipating next waypoint(s) on the VAP 111.

Some embodiments include a user interface for optimizing and/or modifying properties via manual processes (e.g., a VAP 111 allowed for certain VOPs, but not others; (re)activate or disable; erase; etc.). The user interface may also allow a user to designate a path section (or select a number of path selections, e.g., by clicking on each section while holding "Control" or by dragging a box around the selected sections) to activate a drop down or pop-up control interface for accessing relevant settings that may be adjusted by a user.

Some embodiments include defining or modifying properties via automatic processes (e.g., adopting certain properties from higher-level properties, such as zone-specific properties). In addition to aspects of a user interface that involve VAPs and/or VAP sections, a controller may also recognize zones and points that become relevant under defined circumstances. For example, in some embodiments, certain zones or points may be programmed to have properties that automatically (by default) overrule preassigned properties assigned to the pathways or path sections that fall within those zones or contain the specific point (e.g., all path sections within a certain zone may be off-limits to a certain class of VOP 101).

In another aspect, in some embodiments, a VAP 111 may be dynamically adjusted by one or both of a controller and a user interface based upon feedback from multiple active VOPs operating in a same Physical Environment 110 (e.g. when a VAP identifies an obstruction or congestion, the Positioning Server 104 can identify that path section as "blocked" and temporarily "unavailable", until the Positioning Server 104 instructs an available VOP 101 to travel to that same area to investigate whether the obstruction has been removed yet, after which the path section can be switched back to "active" or "available").

In some embodiments, an "off-trail mode" ("wander mode") is included that enables a VOP 101 to reach some station or target that is not located on a VAP 111, such as, by navigating as closely as possible to the station or target using VAPs 111, before taking the shortest off-trail route from there to reach the station or target (while using automatic emergency braking and obstacle avoidance along the way) and then return back to the VAP 111 the same way in reverse.

In another aspect, some embodiments include a "grid mode" wherein a Positioning Server 104 (or other controller) translates a certain defined zone into a number of parallel (but connected) path ways (with a certain orientation and distance between the path ways and a certain travel direction) in order to assign a "grid" task to a certain VOP 101 or set of VOPs 101 instructing the VOP 101 to travel along a generated route of multiple sequential destination positions in order to perform some task, e.g. sweeping or detecting.

Still other embodiments include the ability for "motion planning/optimization" within VAPs 111 that have a certain defined "travel width" and thereby find an optimal VAP (e.g., similar to car racing, avoiding obstacles and taking into account slower or other-direction traffic along the way).

Another aspect includes a VAP 111 with "Dynamic Virtual Approved Pathways" wherein a controller (e.g.; a Positioning Server 104) may keep track of bins/carts/pallets being stored in an open (warehouse space) area, the controller defines certain VAPs 111 dynamically, based on the specific circumstances, such as, by way of non-limiting example, inventory positions at a specified time, and assigning such "Dynamic VAPs" 111 to any VOPs operating in the environment at the time of job creation/allocation (while making sure not to have any other VOPs place inventory on those D-VAPs in the meantime).

In some embodiments, a Tag 102 (or "RTLS Tag") refers to an electronic, battery-operated device (positional sensor) that communicates with Anchors and/or other Tags to determine its real-time location, and therefore the real-time location of the Vehicle or Person it is associated with (e.g., mounted in or on). Some Tags, operated in certain ways, are able to calculate their own real-time location. Some embodiments may include a Tag that broadcasts a unique identification number but does not need to perform any position calculations itself. In such embodiments, a controller, such as a Positioning Server 104, performs positioning calculations and VAP determination, saving significant battery power in an associated Tag 102 and enabling new capabilities and use cases.

Similarly, an Anchor 103 (e.g., a "RTLS Anchor") may include to an electronic device that communicates with other Anchors and/or Tags and a Positioning Server to determine the real-time position of all active Anchors and/or Tags within its environment. In some embodiments, one or more Anchors 103 may include a controller capable of positioning calculations, VAP generation and other processes described herein.

A Positioning Server (e.g., a "RTLS Server") may include to a computer that uses the data received from the Anchors and/or Tags to calculate and/or gather real-time location data. In some embodiments, the Positioning Server 104 generates conditions of one or more Tags 102 at an instance in time. Conditions of Tags 102 may include, by way of non-limiting example one or more of: direction, velocity, acceleration, deceleration, pitch, yaw, roll, or other metric quantifiable via logical processes and/or operation of a sensor). A Positioning Server 104 may process conditions and locations of multiple active Anchors and Tags within a single physical environment 110, or multiple defined physical environments 110. The Positioning Server may be operative to transmit real-time location information over a Wireless Datalink 107 to some or all Tags 102 co-located with Vehicles and/or People within an environment. The Positioning Server 104 may also provide other relevant data to the On-Board Computer on any Vehicles involved, or to e.g., the smart phones of any People involved, including location-based conditions (such as e.g., slippery conditions or obstacles), location-based rules (such as a maximum allowed speed in a certain geofenced area), specific commands (e.g., job requests), and certain alerts (such as e.g., collision risks).

An On-Board Computer may be collocated with a VOP 101 (such as integrated into or supported by the VOP 101) and be to receive information from a Positioning Server 104 via transmissions using the Wireless Datalink 107. Information received may include, by way of non-limiting example, a real-time location of a Tag 102 associated with (such as, mounted in or on) the VOP 101 at an instance in time, a real-time location of another VOP 101 within its environment, the location of certain geofenced areas, and any associated rules (e.g., maximum speed), specific commands (e.g., job requests), and specific alerts (e.g., collision risk). The On-Board Computer may use information received from the Positioning Server 104, as well as data received e.g., from other on-board sensors, to make decisions on such as a speed and direction of travel for an associated VOP 101, possibly adjusting its behavior multiple times during s single travel session.

A person positioned within a same physical environment 110 as operating VOPs 101 may be equipped with a Tag 102 such that a real-time position of the Person can be determined by the Positioning Server 104 and shared with other controllers, such as controllers on Vehicles, automation, equipment, machinery or People. A Person equipped with a personal computing device, such as a Smart Device (e.g., a smart phone, smart watch, smart glasses or tablet) the Person can run executable software to make the Smart Device operative to receive position information (one or both of real time location and historical location information) of all or specific VOPs 101. This allows the Person to make decisions and adjust his or her behavior and actions.

Exemplary Operation

In some embodiments, a VOP 101 collocated or otherwise equipped with a Tag 102, which is placed in or on the VOP 101. Multiple Anchors 14 are positioned around and/or within a Physical Environment 110 in which the VOP 101 is operating. The Anchors 103 exchange RF signals with the Tag 102 and send resulting information to a central Positioning Server 104 over Ethernet or Wi-Fi connection.

Using the information received from the Anchors 103, the Positioning Server 104 determines the real-time location of the Tau 102 on the VOP 101 and therefore a location of the VOP 101 itself at an instance in time. Besides the real-time location of the VOP 101, the Positioning Server 104 may also use the information received from the Anchors 103 to determine details associated with the Tag 102 (e.g., direction, speed, acceleration, etc. of the VOP 101).

The Positioning Server 104 provides the real-time location (and possibly direction, speed, acceleration, etc.) of the VOP 101 to the On-Board Computer 105 of VOP 101, using a Wireless Datalink 22. In some embodiments, the On-Board Computer 105 of VOP 101 may also receive inputs from a number of other sensors, such as, for example, one or more of: Inertial Measurement Units (IMUs), LiDAR sensors, ultrasonic sensors, wheel encoders, vision cameras, or other IoT devices.

Specialized algorithms running on the On-Board Computer 105 or VOP 101 may be used to implement certain logic that combines different sensorial inputs to achieve specific desired behaviors, such as navigating to a target location, following a pre-defined route, slowing down in certain areas, etc. In our current prototype implementation, we are using the open-source Robotic Operating System (ROS), but alternative libraries, drivers, and tools are available or can be developed.

A Graphical User Interface (GUI) provides a user-friendly manner for people to interact with the Positioning Server 104, allowing to impact and control the behavior of the VOP 101 remotely. Voice controls can be used to interact with the Positioning Server 104 and/or with the individual VOP 101, in order to convey certain commands and effect certain actions and behaviors.

Wireless Datalink refers to an apparatus and methods enabling communication of data in a wireless manner. Communication may be accomplished using technologies such as, one or more of: Wi-Fi, Bluetooth, LoRa, UWB, etc. In some embodiments, a Wireless Datalink may be made operative to provide wireless communication of data and information from a central Positioning Server 104 to VOPs 101 and other controllers. This data and information may include an estimated position, direction, speed and acceleration of some, or all of the Vehicles and People involved. The data may also include, for example, conditions and rules that may be position-related.

In various embodiments, a central Positioning Server 104 can be operative for all or some of the calculations referenced to calculate variables associated with the operation of a VOP 101 in a Physical Environment 110, such as, for example one or more of: locations, directions, speeds and accelerations, or Positioning Server 104 may simply gather and communicate this and any other relevant data to one or more of the Vehicles and People involved. While use of a central Positioning Server 104 to communicate real-time positioning data is preferred, it is also possible to calculate a VOPs 101 position by or on the VOP 101 itself, in order to make the VOP 101 operative to execute logic to generate instructions to control the VOP 101. This may be particularly useful for instructions governing quick, short-term, and/or short-distance travel.

Instead of a single Positioning Server, there can be multiple Positioning Servers that may exchange information between them.

Positioning Servers can be implemented as on-premises computers, or be cloud-based, or some mix between the two. Anchors are preferably implemented as fixed infrastructure (one or more Anchors mounted on walls and/or ceilings) but may also be mounted on, for example, mobile tripods for more flexible or temporary deployments.

In some embodiments, one or more Tags 102 may be made operative to fulfil the role of one or more Anchors 103. Anchors 103 can be networked to the Server in different ways, either wired or wireless. Each Anchor 103 may have a direct (e.g., Ethernet) link to the Positioning Server 104, or certain Anchors 103 may be daisy-chained together. Some or all of the Anchors 103 may also communicate with the Positioning Server 104 wirelessly, e.g., over a Wi-Fi connection.

The wireless data link needed to communicate the centrally available real-time location (and direction, speed, acceleration, etc.) does not necessarily need to be secure. However, a secure link is highly preferred, to reduce security risks. Besides or instead of a Graphical User Interface (GUI) it is also possible to use alternative user interfaces, such as a command line interface.

Unlike autonomous Vehicles, People are not controlled by on-board computers, but any of the real-time location data available on the Positioning Server 104 can be shared with People as well, by sending it to their smart phone or tablet.

The autonomous Vehicles, or simply Vehicles, referred to in this document include any types of machines that have some method of propulsion and some method of steering, and that can be made to exhibit automated or autonomous behaviors, including but not limited to moving from one location to another within a certain physical space. Information obtained about the estimated position, direction, speed and acceleration of any Vehicles or People could be shared not only with Vehicles and People that are operating in the same physical space, but possibly also with Vehicles or People that are operating in different physical spaces. This would allow for behavior replication or behavior duplication in different physical spaces. The components and concepts described herein may be referred to by other nomenclature, such as, for example anchors 103 may be referred to as beacons; position and location can largely be used interchangeably; direction and orientation can be used interchangeably; speed and velocity may also be used interchangeably. For the sake of brevity, "Positioning Server" may be referred to as "Server", or "RTLS Positioning Server".

A VOP 101 involved may be operative via executable software to know a real-time position of any other objects that also carry Tags, thereby enabling safe operation. Autonomous Vehicles can modify their behavior depending on whether another nearby object is a Vehicle or a Person or multiple People, slowing down and/or keeping a further distance when approaching or being approached by People. A Person wearing a Tag can be notified whenever a Vehicle (or possibly another Person) is approaching them, possibly on a collision course that may be obstructed from view.

Specific areas can be defined ("geofenced") centrally, on or via the central Positioning Server, with specific parameters such as maximum allowed speed, minimum distance, etc. Then, as the Vehicle knows its real-time position relative to these geofenced areas, it can modify its behavior based on the area it is navigating through or towards (slow down or avoid altogether). Vehicles can also be told remotely to increase their distance from certain other Vehicles, People, or any other known objects, in order to increase safety.

Via the central Positioning Server, a Vehicle can be provided with a specific, fixed location (a location coordinate or location name) in the space where it is operating, in order for the Vehicle to autonomously navigate towards that location. Moreover, a Vehicle can also be given the Tag ID or some other unique identification (such as a universally unique identifier or name) of a mobile object, in order for the Vehicle to navigate towards, find, and meet up with that mobile object—all while moving around safely and possibly following Virtual Approved Pathways. This capability makes it possible for autonomous Vehicles to find and retrieve mobile carts that are not always in a same exact physical location, and/or. bring certain materials, equipment or tools to people that need these materials, equipment or tools, but are moving around a shopfloor. An autonomous Vehicle may come or go to find a specific Object or Person, anywhere within the physical space covered by the Anchors, simply by using a voice command with the Object or Person's unique Tag ID.

Specific routes for a Vehicle to follow can be established by defining a set of digital coordinates, also called waypoints.

These waypoints can be defined in a number of different ways. They may be established for example, by physically moving a Tag along the desired route and recording the Tag's position along the way. The waypoints may also be established on the Positioning Server, either through a terminal using some (graphical) user interface or using a wearable device such as a smart phone or tablet, by tracing or drawing them on a graphical representation (such as a floor plan) of the environment where the Vehicle is or will be operating. Virtual Routes can be established, managed, and updated on the central Positioning Server, and shared with any Vehicles involved using the Wireless Datalink or some other wireless datalink.

Beyond establishing a specific Virtual Route for a Vehicle to follow, it is also possible to define (e.g., record or draw as described above) a network of virtual routes that specific autonomous Vehicles are allowed to choose from when navigating from one point to another. Vehicles can use specialized algorithms, including, for example, path optimization techniques, in order to choose a route that is most desirable, such as, form example, one or more of: safest, shortest, fastest, or most efficient. They can also pick an alternate route from the available approved pathways in case a preferred route is not available (e.g., blocked). Virtual Approved Pathways can be established, managed, and updated on the central Positioning Server, and shared with any Vehicles involved using the Wireless Datalink or some other wireless datalink. This also makes it possible to modify the set of Virtual Approved Pathways automatically, in case some problem, such as for example, an obstruction, is detected, possibly by another Vehicle encountering the problem. By sending updated Virtual Approved Pathways to other Vehicles involved, the other Vehicles can modify their routes, to avoid the same obstacle, until the issue is resolved.

Vehicles connected to the same central Positioning Server over a Wireless Datalink can know each other's precise and real-time absolute locations and relative positions, and share any relevant information such as for example, location-based conditions. The present invention also allows for the integration with enterprise systems, such as for example, Enterprise Resource Planning (ERP), Manufacturing Execution Systems (MES), Advanced Planning and Scheduling (APS), and Warehouse Management Systems (WMS), in order to communicate further relevant data to any Vehicles involved, e.g., providing them with real-time job instructions.

Figure 2:
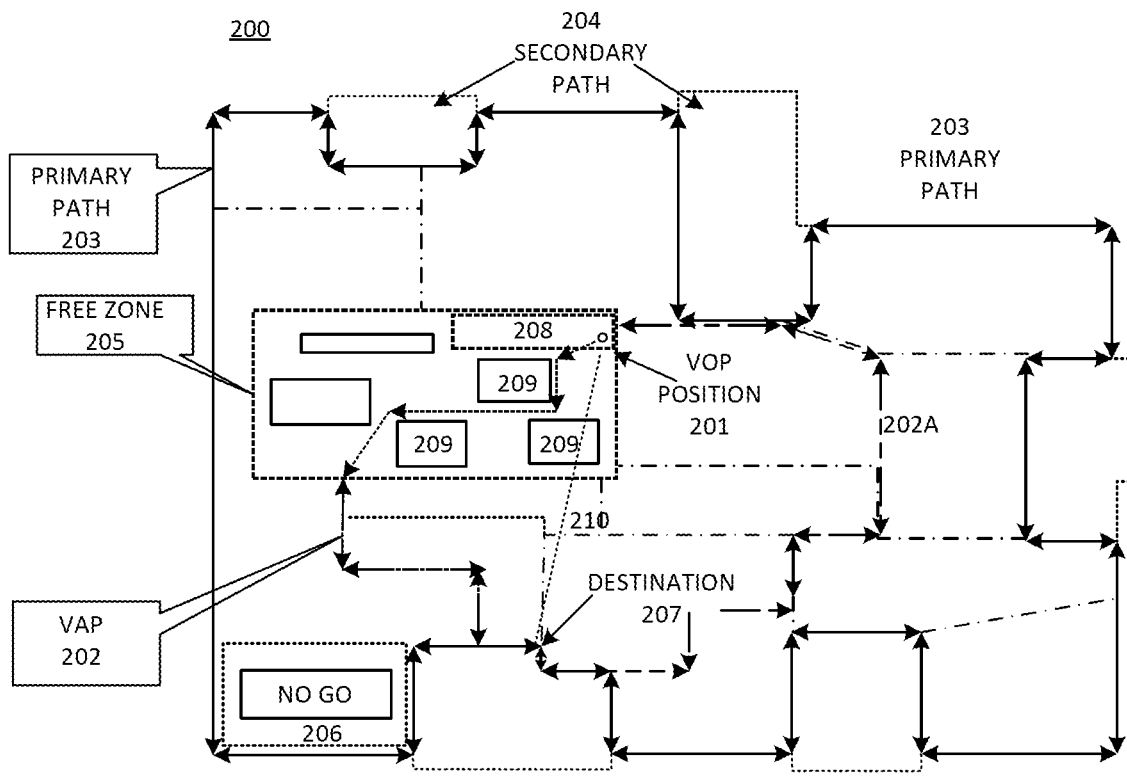
FIG. 2 illustrates an exemplary user interface with various virtual authorized paths for an unmanned vehicle or person

Referring now to FIG. 2, according to some embodiments of the present invention (and as illustrated) a two-dimensional surface layout of representing a physical environment 200 and virtual pathways 202-204 that a VOP may travel according to a series of current position designations and destination positions. Other embodiments may include a three dimensional or perspective view in a user interface.

An exemplary user interface is shown with various user interactive portions. As illustrated a VOP position 201 is shown adjacent to a staging area 208. The VOP (not illustrated in FIG. 2) will travel along the VAP 202 to reach a destination 207. The VAP 202 circumvents one or more obstacles 209 that prevent the VOP from traveling in a direct line path 210 to reach the destination 207. The VAP 202 traverse a Free-Roam Zone 205 in which the VAP may take any path not obstructed by an obstacle 209. Other zones include a No Go Zone 206 which is designated as being off limits to VOP travel. A controller or user that attempts to generate a VAP 202 that traverse a No Go Zone 206 will be excluded from including Destination Position coordinates that fall with the No Go Zone 206. However, in some embodiments, an administrator or other user with credentials authorizing traversing a No Go Zone may override the exclusion of the No Go Zone 206. In some embodiments, an alternate VAP 202A may also be generated and one or both of the VOP and a user may choose the alternate VAP to have the VOP reach the destination 207. Selection of the alternate VAP 202A may also be guided by traversal variables, such as maximum speed of a VOP on a VAP 202-202A, number of changes in direction (turns) along the VAP, congestion on the VAP 202-202A, surface conditions on the VAP (e.g., roughness, bumps, liquids, ice, etc.).

As illustrated, in some embodiments, a user interface, and corresponding logic referenced by a controller in charting a VAP 202-202A, may include one or more Primary Paths 203 and/or Secondary Paths 204. A path for a VOP may be designated as a Primary Path 203 or Secondary Path 204, based upon one or both of: logic used to generate a path with a controller, and user preference. In some embodiments, a Primary Path 203 and/or Secondary Path 204 will be so designated based upon a type of VOP that will travel the path, contents carried by the VOP, congestion, events in the physical environment (e.g., change of shift, materials restocking, maintenance events, cleaning, or any other occurrence or variable that may influence the experience of a VOP traversing the path).

In some implementations, logic used by one or both of a controller and a user may be sourced with values for variables considered in generating a VAP 202-204. Variables may include, by way of non-limiting example, a cargo carried by a VOP. Cargo may include, for example a liquid that may move within a container carried by the VOP if the VOP is required to make sharp turns, accelerate, decelerate, stop, traverse irregular surfaces and the like.

Accordingly, surface conditions may influence and/or dictate a choice that logic makes in generating a VAP 202-204. Other consideration may include how close a VAP may bring a VOP (and the VOP cargo) to persons, sensitive equipment, other VOPs, ambient environmental conditions, and almost any other variable that may be influenced by or influence a VOP and/or VOP cargo. In some embodiments, sensors, such as IoT sensors may monitor environmental conditions and values descriptive of the environmental conditions may be included as variables in a logical process that generates a VAP. By way of non-limiting example, variables may include, a maximum and/or minimum temperature range of an environment along a VAP, an amount of static, electromagnetic radiation, nuclear radiation, biologic contamination (including contamination to food stuffs), moisture and/or liquid exposure, airborne particulate, and almost any other condition quantifiable with a sensor.

Figure 3:
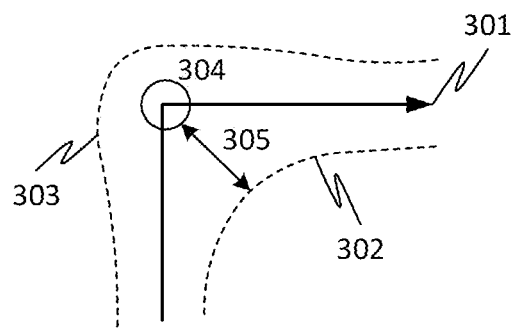
FIG. 3 illustrates a variance tolerance for a virtual approved path.

Referring now to FIG. 3, in another aspect, a VAP 301 may have a variance tolerance that allows for an actual path travelled 302-303 to deviate from a path of prescribed destination points. A variance tolerance 305 may be based upon a physical distance (e.g., up to 0.5 meter from a prescribed destination point 304 and/or path) or a percentage of width of a VAP (e.g., 10% of VAP width). In some embodiments, a variance tolerance may be adjusted for conditions under which a VOP is operating. For example, a VOP under full load may be allowed a greater variance, a VOP operating in conditions with very little other VOP traffic may be allowed a greater variance tolerance and/or to operate at faster speeds, and a VOP entering an area including persons, and/or sensitive equipment or machines may be limited to very slow speed and very small variance tolerance.

Other variables that may be included in logic used to generate a VAP 202-204 may include a path that: is fastest, shortest, highest speed, lowest speed, most energy efficient, preferred point of travel (e.g., path is monitored by camera or person), least likely to have stops or slow downs, favorable surface conditions (textured to prevent slipping, smoothest, painted, coated, low static, rubberized, no need to open or close doors (e.g., areas with cold storage, clean rooms, controlled environment of moisture, heat, particulate, static, etc.) need for ingress/egress a room or area, need to actuate doors, desire to rotate stock, collision avoidance, required turns (obstacles) tipping, slowing, cargo shifting.

In some embodiments, a Positioning Server or other controller generating a VAP may receive data from one or more IoT devices collocated with a VOP that monitor variables indicative of conditions during operation of the VOP. Conditions may include, for example, tilting, tipping, temperature, agitation, vibration, impact, acceleration, deceleration, and ceased movement.

The capabilities enabled by the present invention are highly relevant and useful in a diverse range of environments and industries, including but not limited to Manufacturing, Materials Management, Logistics, Healthcare and Eldercare. For example, in Manufacturing and Materials Management, The present invention allows for autonomous Vehicles that: a VOP may find and retrieve the right materials, parts, equipment or tools, as and when they are needed, no matter where they are on the shopfloor or in the warehouse where the Vehicles are operating and bring the right materials, parts, equipment or tools to the right workstation as they are needed.

In another aspect, a Just-In-Time or Just-In-Sequence process may be enabled via moving a mobile work platform from workstation to workstation as a product is being assembled. A VOP may retrieve, pick up, transport, and drop off one or more of: parts, materials, equipment, and people safely and autonomously across and around a plant or warehouse floor, using VOPs (such as, automated carts, robots, forklifts, utility terrain vehicles or other carrier or automation that are enabled with the intelligent autonomous capabilities made possible using the apparatus and methods presented herein.

In some embodiments, the present invention enables autonomous Vehicles that find and retrieve a person or item(s). For example, a Person (e.g., an Order Picker) who needs—or is expected to need—a Vehicle such as a picking cart, waits around in a safe location until needed, then the cart is dispatched to follow the Person as the Person loads materials onto the Vehicle. The Vehicle may then autonomously take the loaded materials to where they are needed, such as, for example to a manufacturing station, or for packaging and shipping. A next picking routine may be supported by a next autonomous Vehicle that available.

In some examples, in Healthcare, the present invention allows for autonomous Vehicles that transport people safely and autonomously around a clinic or hospital environment and bring needed medical equipment (e.g., crash carts), medications, or other materials to where they are needed, autonomously, safely, timely, and expeditiously. In Eldercare, the present invention allows for autonomous Vehicles that transport people safely and autonomously around the care or retirement home or community and bring needed equipment or supplies to where they are needed, autonomously, safely, timely, and expeditiously.

provides apparatus and methods for improved operation of a robot that traverses a defined path wherein the path is based upon positioning determined via wireless communication. The robot mobilizes from a current position to a next destination position. The current position and next position are associated with a set of positional coordinates. Positional coordinates may also have an acceptable tolerance such that if the robot is positioned proximate to a set of positional coordinates, a controller issuing mobilization commands will consider the robot to have reached a destination position and move to a next destination position in a sequence of destination positions.

In some embodiments, positioning may be augmented via additional modalities offering diverse methods and apparatus for determining a position of the robot such as accelerometers, infrared sensors, LiDAR, SLAM, image recognition, and the like. In some embodiments, a controller may operate according to a hierarchy of position determining modalities. For example, a controller may place UWB positioning as a highest prioritized modality and image recognition as a lower priority positioning modality.

A controller defines a series of origination positions and destination positions, each destination position correlating with position coordinates. Control commands are provided to the robot to cause the robot to propel itself to each successive destination position based upon a current location of the robot and direction the robot is facing.

Position coordinates may be a set of values that accurately define a position in two dimensional 2D or three-dimensional (3D) space. Position coordinates may include by way of non-limiting example one or more of: cartesian coordinates (e.g., X, Y, Z), polar coordinates (e.g.; angle and distance), and cylindrical coordinates (e.g.; angle, distance and height).

The present invention provides for determination of a current position definable via the positional coordinates via wireless communications. Preferred wireless communications are performed via an ultrawideband communication modality. Other communication modalities may include, for example, Bluetooth, WiFi, infrared, cellular and global positioning systems (GPS).

As described herein, in some embodiments, a series of positional coordinates are defined in sequence. A trajectory is generated to guide a robot from a current position to a next destination point. On a periodic basis, wireless communications are utilized to calculate a current position, the trajectory may be updated following determination of each current position, or upon reaching some set value, or minimum set value of current position calculations. A controller delivers control commands, such as, for example, digital command or analog power) to the robot to cause the robot to traverse from a current position to a next destination position.

Some embodiments additionally include drawing a path on a smart device or other controller interface, the path may overlay a 2D or 3D representation of an environment. The path may be transcribed into a series of multiple destination points. Unlike previously known control systems, a series of origination positions interior to a building may be calculated via UWB communications (or other wireless communications) between a transceiver collocated with the robot (sometimes referred to herein as a "Tag") and transceivers located at know reference points ("Anchors"). In addition, the present invention provides for handoff of UWB communications between the Tag and sets of multiple disparate Anchors, each anchor coordinated with a single origination point from which positional coordinates may be calculated.

Figure 4:
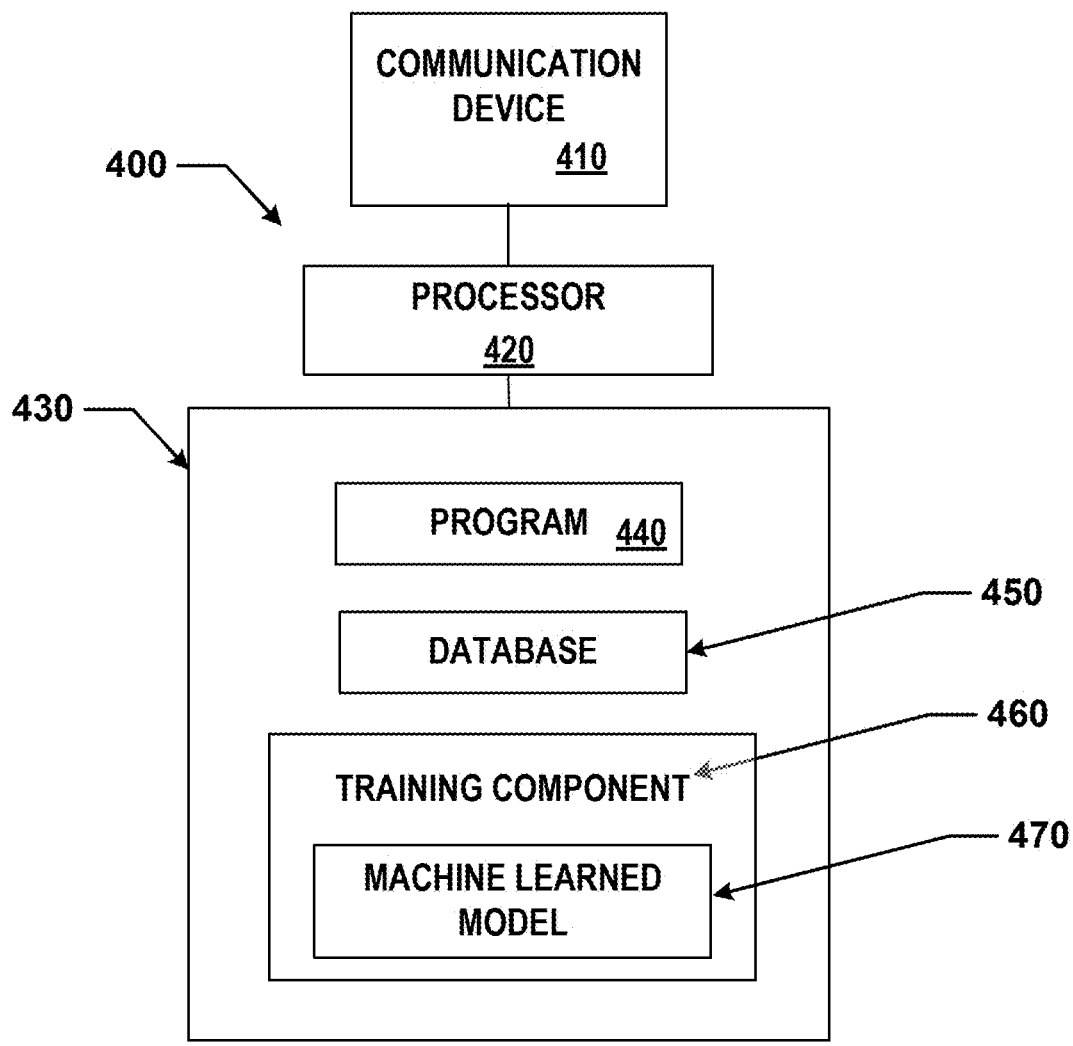
FIG. 4 illustrates an exemplary controller as used in the present invention.

Referring now to FIG. 4 an automated controller is illustrated that may be used to implement various aspects of the present disclosure, in various embodiments, and for various aspects of the present disclosure, controller 400 may be included in one or more of: a wireless tablet or handheld device, a server, a rack mounted processor unit. The controller may be included in one or more of the apparatuses described above, such as a Server, and a Network Access Device. The controller 400 includes a processor unit 420, such as one or more semiconductor-based processors, coupled to a communication device 410 configured to communicate via a communication network (not shown in FIG. 4). The communication device 410 may be used to communicate, for example, with one or more online devices, such as a personal computer, laptop, or a handheld device.

The processor 420 is also in communication with a storage device 430. The storage device 430 may comprise any appropriate information storage device, including combinations of magnetic storage devices, optical storage devices, and/or semiconductor memory devices such as solid-state drives, Random Access Memory (RAM) devices and Read Only Memory (ROM) devices.

The storage device 430 can store a software program 440 with executable logic for controlling the processor 420. The processor 420 performs instructions of the software program 440, and thereby operates in accordance with the present disclosure. In some examples, the processor may be supplemented with a specialized processor for AI related processing. The processor 420 may also cause the communication device 410 to transmit information, including, in some instances, control commands to operate apparatus to implement the processes described above. The storage device 430 can additionally store related data in a database 450. The processor and storage devices may access an AI training component 460 and database, as needed which may also include storage of machine learned models 470.

Figure 5:
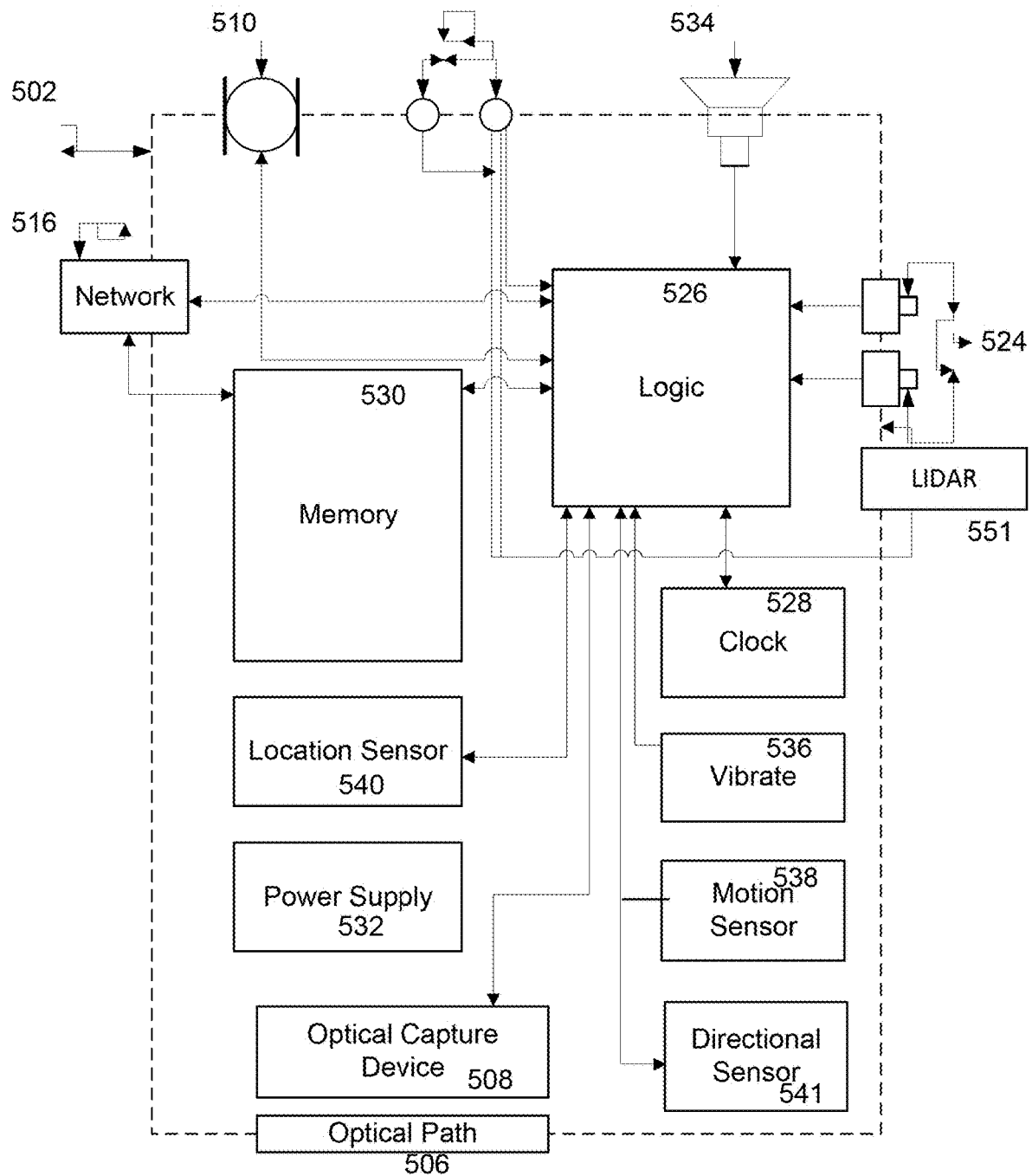
FIG. 5 illustrates an exemplary embodiment of a smart device according to the present invention.

Referring now to FIG. 5, a block diagram of an exemplary mobile device 502 is illustrated. The mobile device 502 comprises an optical capture device 508 to capture an image and convert it to machine-compatible data, and an optical path 506, typically a lens, an aperture, or an image conduit to convey the image from the rendered document to the optical capture device 508. The optical capture device 508 may incorporate a Charge-Coupled Device (CCD), a Complementary Metal Oxide Semiconductor (CMOS) imaging device, or an optical Sensor 524 of another type.

A microphone 510 and associated circuitry may convert the sound of the environment, including spoken words, into machine-compatible signals. Input facilities may exist in the form of buttons, scroll wheels, or other tactile Sensors such as touchpads. In some embodiments, input facilities may include a touchscreen display.

Visual feedback to the user is possible through a visual display, touchscreen display, or indicator lights. Audible feedback 534 may come from a speaker or other audio transducer. Tactile feedback may come from a vibrate module 536.

A motion Sensor 538 and associated circuitry convert the motion of the mobile device 502 into machine-compatible signals. The motion Sensor 538 may comprise an accelerometer that may be used to sense measurable physical acceleration, orientation, vibration, and other movements. In some embodiments, motion Sensor 538 may include a gyroscope or other device to sense different motions.

A location Sensor 540 and associated circuitry may be used to determine the location of the device. The location Sensor 540 may detect Global Position System (GPS) radio signals from satellites or may also use assisted GPS where the mobile device may use a cellular network to decrease the time necessary to determine location.

The mobile device 502 comprises logic 526 to interact with the various other components, possibly processing the received signals into different formats and/or interpretations. Logic 526 may be operable to read and write data and program instructions stored in associated storage or memory 530 such as RAM, ROM, flash, or other suitable memory. It may read a time signal from the clock unit 528. In some embodiments, the mobile device 502 may have an on-board power supply 532. In other embodiments, the mobile device 502 may be powered from a tethered connection to another device, such as a Universal Serial Bus (USB) connection.

The mobile device 502 also includes a network interface 516 to communicate data to a network and/or an associated computing device. Network interface 516 may provide two-way data communication. For example, network interface 516 may operate according to the interne protocol. As another example, network interface 516 may be a local area network (LAN) card allowing a data communication connection to a compatible LAN. As another example, network interface 516 may be a cellular antenna and associated circuitry which may allow the mobile device to communicate over standard wireless data communication networks.

In some implementations, network interface 516 may include a Universal Serial Bus (USB) to supply power or transmit data. In some embodiments other wireless links may also be implemented.

As an example of one use of mobile device 502, a reader may scan an input drawing with the mobile device 502. In some embodiments, the scan may include a bit-mapped image via the optical capture device 508. Logic 526 causes the bit-mapped image to be stored in memory 530 with an associated timestamp read from the clock unit 528. Logic 526 may also perform optical character recognition (OCR) or other post-scan processing on the bit-mapped image to convert it to text.

A directional sensor 541 may also be incorporated into the mobile device 502. The directional device may be a compass and be based upon a magnetic reading or based upon network settings.

A LiDAR sensing system 551 may also be incorporated into the mobile device 502. The LiDAR system may include a scannable laser light (or other collimated) light source which may operate at nonvisible wavelengths such as in the infrared. An associated sensor device, sensitive to the light of emission may be included in the system to record time and strength of returned signal that is reflected off of surfaces in the environment of the mobile device 502.

Using real-time location data, calculated or collected on a central Positioning Server and shared over a secure Wireless Datalink, the present invention provides control to coordinate movements and activities of Vehicles and People that navigate around a shared physical space.

A centralized approach, as described herein has numerous advantages, including but not limited to: being able to orchestrate safe and efficient navigation and collaboration between Vehicles and People operating within a shared physical space; enabling autonomous Vehicles to modify their behavior (e.g. slow down) based on both their absolute location within the overall environment (e.g. shopfloor) and their relative position compared to any other Vehicles and People in their vicinity; and enabling flexible control the behavior of any autonomous Vehicles live, remotely, and in a centralized fashion, by modifying settings (e.g. the maximum allowed speed) or by defining e.g. new routes, approved pathways, geofenced areas, etc. on the Positioning Server.

The described methods and apparatus enable non-autonomous vehicles to be converted into autonomous vehicles, and to upgrade the capabilities of existing ("traditional") autonomous vehicles into more intelligent and more capable autonomous Vehicles, by adding a Real-Time Locating System (RTLS) and implementing a version of the software we developed to control the Vehicles' behavior and configure relevant parameters on the Positioning Server using a (graphical) user interface.

The described methods and apparatus are highly scalable and can be used to control a single Vehicle, as well as to control and coordinate multiple or many Vehicles and People at once.

Ultimately, The present invention enables true Vehicle-to-Vehicle (V2V), Vehicle-to-Infrastructure (V2I) and Vehicle-to-People (V2P) interaction and orchestration.

In some embodiments, the present invention also provides for current position coordinates, destination position coordinates and final destination coordinates that may be generated via any method of generating a sequence of positional coordinates compatible with logic processed by a controller involved. Some preferred embodiments include generating a VAP via one or more of: using a GUI to define individual path waypoints (such as for example, clicking with mouse or tapping with finger); entering waypoints as coordinates, entering waypoints based upon assigned nomenclature; draw pathway (drawing with mouse or finger) on a floorplan; a controller identifies relevant path points along a human-defined pathway (path waypoints stored in memory as simpler representation of pathway) based upon criteria including a distance between the waypoints; according to intersections with prior defined pathways along a defined pathway (identified intersections stored in memory and may be in relation to VAPs previously defined by one or both of a human and a controller); using a RTLS (UWB) Tag and periodic registration of waypoint equivalent to a position of the Tag.; moving a Tag along a certain trajectory, while recording its trajectory, thus defining an approved pathway (which can be edited further in a next step).

A VAP may be modified via one or more of: using a GUI to select specific path points and drag them in a different location (with mouse or finger); and select a specific path section and change its shape (such as, for example using a mouse or finger to trace a preferred path within a margin of acceptable variation), define additional waypoints to be included, include positions defined via nomenclature to be included. A VAP shape may be automatically modified via one or more of: path optimization based, for example upon VOP characteristics or limitations, such as, for example an ability to negotiate a turning radius and/or ability to traverse an incline.

A controller may also provide functionality for one or more of: "auto smoothens" trajectories; highlights parts of trajectories that are not feasible for specific (classes of) bots due to geometric limitations of the vehicle (e.g., too sharp turn for bot's turning radius) and/or under certain circumstances (e.g., meant to carry a wide load); until all issues have been corrected manually; until auto-suggested corrections are accepted by a user (and/or administrator); auto-adjusts/auto-smoothens/auto-corrects trajectories to create feasible pathways to accommodate performance characteristics of different for different classes of bots, based on their particular steering mechanisms (e.g., skid steering vs. front wheel steering such as Ackermann steering).

Some embodiments include optimizing a VAP, such as via providing a smooth transition from one destination position to a next destination position, such as via one or both of: by smoothening the VAP; and by anticipating the next waypoint(s) on the VAP. Some embodiments include optimizing and/or modifying properties via manual processes (e.g., a VAP allowed for certain bots, but not others; (re) activate or disable; erase; or other editing). Click on a path section or select a number of path selections, e.g., by clicking on each section while holding "Control" or by dragging a box around the selected sections such that a menu appears with relevant settings that may be adjusted; right-click on an individual path section to cause a shorter menu to appear with a limited selection (e.g.,' more essential) settings can be accessed and modified Some embodiments include defining or modifying properties via automatic processes (e.g., adopting certain properties from higher-level properties, such as zone-specific properties). Besides pathways and path sections, a controller may also recognize zones and points. Depending on the circumstances, certain zones or points may have properties that automatically (by default) overrule certain properties assigned to the pathways or path sections that fall within those zones or contain the specific point (e.g., all path sections within a certain zone may be off-limits to a certain class of bots). In addition, in some embodiments, available or preferred path ways can be dynamically adjusted by the a controller based upon collective feedback from all active bots operating in the same environment (e.g. when a bot identifies an obstruction or congestion, the central computer can identify that path section as "blocked" and temporarily "unavailable", until the central computer decides to send an available bot out to that same area to investigate if the obstruction has been removed yet, after which the path section can be switched back to "active" or "available").

In some embodiments, an "off-trail mode" ("wander mode") is included that enables a bot to reach some station or target that is not located on a VAP, e.g., by navigating as closely as possible to the station or target using VAPs, before taking the shortest off-trail route from there to reach the station or target (while using automatic emergency braking and obstacle avoidance along the way) and then return back to the VAP the same way in reverse.

In another aspect, some embodiments include a "grid mode" wherein a controller translates a certain defined zone into a number of parallel (but connected) pathways (with a certain orientation and distance between the pathways and a certain travel direction) in order to assign a "grid" task to a certain (set of) bot(s), whereby the bot(s) travel along the generated route (in order to perform some task, e.g., sweeping or detecting).

Still other embodiments include the ability for "motion planning/optimization" within VAPs that have a certain defined "travel width"→find optimal path (e.g., similar to car racing, avoiding obstacles and taking into account slower or other-direction traffic along the way)

Another aspect includes a VAP with "Dynamic Virtual Approved Pathways" wherein a controller may keep track of bins/carts/pallets being stored in an open (warehouse space) area, the central server could define certain VAPs dynamically, based on the specific circumstances—such as inventory positions—at the time, assigning these "Dynamic VAPs" to any bots operating in the environment at the time of job creation/allocation (while making sure not to have any other bots place inventory on those D-VAPs in the meantime).

Figure 6:
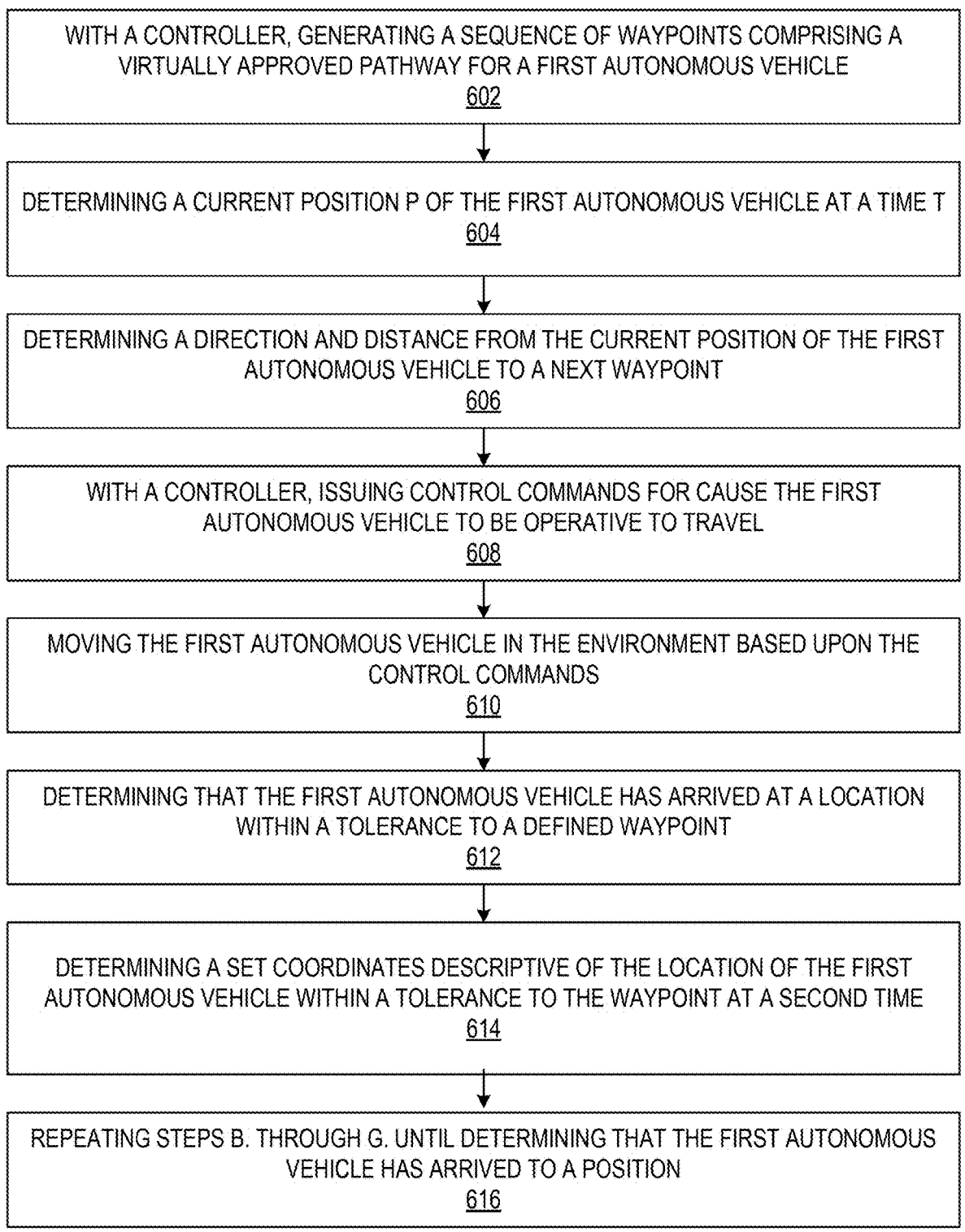
FIG. 6 illustrates method steps that may be implemented in some embodiments of the present invention.

Referring now to FIG. 6 a flowchart describes method steps that may be implemented in some embodiments of the present invention for controlling movement of an autonomous vehicle.

In some embodiments, at step 602, the method may include, generating a sequence of waypoints including a virtually approved pathway for a first autonomous vehicle in an environment. At step 604, a current position P of the first autonomous vehicle may be determined at a time T based upon a wireless communication C between a transceiver tag collocated with the first autonomous vehicle and ultrawideband anchors located at known locations relative to the origin point during the wireless communication.

At step 606, the method may additionally include determining a direction and distance from the current position of the first autonomous vehicle to a next waypoint P+1 of the plurality of the sequence of positions.

At step 608, a controller may issue control commands to cause a first autonomous vehicle to be operative to travel in the direction and distance towards the next waypoint P+1.

At step 610, the method may include moving the first autonomous vehicle in the environment based upon the control commands, and at step 612, the method may include determining that the first autonomous vehicle has arrived at a location within a tolerance to waypoint P+1.

At step 614, the method may include determining a set of coordinates descriptive of the location of the first autonomous vehicle within a tolerance to waypoint P+1 at second time T2 based upon a sequential wireless communication C+1 between a transceiver collocated with the first autonomous vehicle and ultrawideband anchors located at known locations relative to the origin point during the wireless communication.

At step 616, the method may include repeating positioning steps until determining that the first autonomous vehicle has arrived to a position within a tolerance to the destination position. The positioning steps may be repeated by the controller on a periodic basis measured in time units and/or an interval based upon a distance travelled by the first autonomous vehicle. A tolerance may include a unit of distance measurement. In some embodiments, the tolerance may include a numerical designation for position coordinates.

A step of modifying the destination position may be conducted to correlate with a location of a mobile target, in addition, the waypoints may also be modified based upon the modified destination position.

At least some wireless communications C and C+1 may include transceiving using an ultrawideband modality. A user interface may be generated on a user interactive display. The user interface may include a representation of the environment and a virtual approved pathway, and preferably, at least some of the waypoints. In some embodiments, the method may include generating respective sets of coordinates for the waypoints included in the virtual approved pathway and/or specifying an origin point relative to the environment.

In some embodiments, methods may include the step of charting a trajectory of the first autonomous vehicle and a route of travel based upon a virtually approved pathway.

A velocity of the first autonomous vehicle, and an acceleration of the first autonomous vehicle. In some embodiments, one or both of, the method may include performing one or more additional steps. A velocity of the first autonomous vehicle, and an acceleration of the first autonomous vehicle can be calculated with reference to the respective times T. In some embodiments, the method may include referencing the trajectory, determining that the first autonomous vehicle may collide with an item if the trajectory may be followed. Method steps may also include the step of modifying the sets of coordinates for the waypoints to avoid a potential collision.

In some embodiments, the methods include generating a user interface on a user interactive display, the user interface. A representation of the environment and a virtual approved pathway. At least some of the waypoints. Respective sets of coordinates for the waypoints may also be generated and included in a virtual approved pathway.

In some embodiments, the method includes charting a trajectory for one or both of a first autonomous vehicle, and a second autonomous vehicle (and additional VOPs). The trajectory may include a route of travel, a velocity of the first autonomous vehicle, and an acceleration of the first autonomous vehicle. In some embodiments, a velocity of the first autonomous vehicle, and an acceleration of the first autonomous vehicle may be calculated with reference to the respective times T.

In some embodiments, the method may include referencing the trajectory, and determining that an autonomous vehicle may collide with an item if the trajectory is followed. A potential collision may involve a second autonomous vehicle travelling in the environment. In such embodiments, the step of transmitting a control command from the controller to one or both of the autonomous vehicles to modify a rate of travel sufficiently to avoid collision. In some embodiments, the modifying of the rate of travel sufficient to avoid collision includes at least one of: accelerating, decelerating, and stopping a vehicle.

Conclusion

A number of embodiments of the present disclosure have been described. While this specification contains many specific implementation details, there should not be construed as limitations on the scope of any disclosures or of what may be claimed, but rather as descriptions of features specific to particular embodiments of the present disclosure. While embodiments of the present disclosure are described herein by way of example using several illustrative drawings, those skilled in the art will recognize the present disclosure is not limited to the embodiments or drawings described. It should be understood the drawings and the detailed description thereto are not intended to limit the present disclosure to the form disclosed, but to the contrary, the present disclosure is to cover all modification, equivalents and alternatives falling within the spirit and scope of embodiments of the present disclosure as defined by the appended claims.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted the terms "comprising", "including", and "having" can be used interchangeably.

Certain features that are described in this specification in the context of separate embodiments can also be implemented in combination in a single embodiment. Conversely, various features that are described in the context of a single embodiment can also be implemented in combination in multiple embodiments separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while method steps may be depicted in the drawings in a particular order, this should not be understood as requiring that such operations be performed in the particular order shown or in a sequential order, or that all illustrated operations be performed, to achieve desirable results.

Certain features that are described in this specification in the context of separate embodiments can also be implemented in combination in a single embodiment. Conversely, various features that are described in the context of a single embodiment can also be implemented in combination in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order show, or sequential order, to achieve desirable results. In certain implementations, multitasking and parallel processing may be advantageous. Nevertheless, it will be understood that various modifications may be made without departing from the spirit and scope of the claimed disclosure.

In certain implementations, multitasking and parallel processing may be advantageous. Nevertheless, it will be understood that various modifications may be made without departing from the spirit and scope of the claimed disclosure.

What is claimed is:

1. A method of controlling movement of a first or second autonomous vehicle, the method comprising;
   a. generating a sequence of waypoints defined as destination position coordinates comprising one or more of: cartesian coordinates, polar coordinates, and cylindrical coordinates, the sequence of waypoints comprising a virtually approved pathway for the first autonomous vehicle in an environment via tracing the virtually approved pathway on a graphical representation comprising a floorplan of the environment;
   b. determining a current position P of the first autonomous vehicle at a time T1 based upon a wireless communication C between a transceiver tag collocated with the first autonomous vehicle and one or more ultrawideband anchors located at known locations on one or both of: a wall and a ceiling;
   c. determining a direction and a distance from the current position of the first autonomous vehicle at the time T1 to a next waypoint P+1 included in a sequence of positions;
   d. with a controller, issuing a control command to cause the first autonomous vehicle to be operative to travel in the direction and the distance towards the next waypoint P+1, the control command based upon a current location of the first autonomous vehicle and a direction the first autonomous vehicle is facing;
   e. moving the first autonomous vehicle in the environment based upon the control command;
   f. determining that the first autonomous vehicle has arrived at a location within a tolerance to waypoint P+1;
   g. determining a set of coordinates descriptive of the location of the first autonomous vehicle within the tolerance to waypoint P+1 at second time T2 based upon a sequential wireless communication C+1 between the transceiver tag collocated with the first autonomous vehicle and the one or more ultrawideband anchors on one or both of the wall and the ceiling and located at known locations relative to an origin point during the wireless communication;
   h. repeating steps b. through g. with the controller on periodic basis measured in time units, until determining that the first autonomous vehicle has arrived to a position within the tolerance to a destination position; and
   i. repeating steps b. through g. with the controller at an interval based upon the distance travelled by the first autonomous vehicle.

2. The method of claim 1 wherein at least one of the wireless communication C and the sequential wireless communication C+1 comprise transceiving using an ultrawideband modality, and the current position P is determined via a controller receiving timing signals included in a timing signal and processing an algorithm comprising at least one of trilateration and triangulation.

3. The method of claim 2 additionally comprising steps of generating a user interface on a user interactive display, the user interface comprising a floorplan representation of the environment; drawing a pathway on a portion of the user interface comprising the floorplan to define the virtually approved pathway comprising at least some of the waypoints; and defining a waypoint via interaction with the user interface comprising at least one of: clicking a mouse and tapping a finger.

4. The method of claim 3 additionally comprising steps of specifying the origin point relative to the environment; and generating respective sets of coordinates for the waypoints included in the virtually approved pathway via interaction with the user interface comprising at least one of: clicking the mouse and tapping the finger.

5. The method of claim 4 additionally comprising a step of charting a trajectory of the first autonomous vehicle, the trajectory comprising a route of travel along the virtually approved pathway and one or both of: a velocity of the first autonomous vehicle, and an acceleration of the first autonomous vehicle at a time between T1 and T2.

6. The method of claim 5, additionally comprising steps of: referencing the trajectory of the first autonomous vehicle determining that the first autonomous vehicle may potentially collide with an obstacle if the trajectory towards a mobile target's position at time T2 is followed.

7. The method of claim 6 additionally comprising a step of modifying the respective sets of coordinates for the waypoints included in the virtually approved pathway to avoid potentially colliding with the item.

8. The method of claim 7 wherein the potential collision involves the second autonomous vehicle travelling in the environment.

9. The method of claim 8 additionally comprising a step of transmitting a control command from the controller to one or both of: the first autonomous vehicle and the second autonomous vehicle to modify a rate of travel and avoid the potential collision.

10. The method of claim 9, wherein the modifying of the rate of travel and avoiding the potential collision comprises at least one of:
    stopping, accelerating, and decelerating.

11. The method of claim 4 additionally comprising steps of operating a sensor to generate data quantifying a condition within the environment, and transmitting the data quantifying the condition within the environment to the controller.

12. The method of claim 11 additionally comprising steps of: based upon the data quantifying a condition at a sensor location within the environment, modifying at least one waypoint included in the sequence of waypoints.

13. The method of claim 11 additionally comprising steps of: based upon the data quantifying the condition at a sensor location within the environment, transmitting the control command from the controller to the first autonomous vehicle causing the first autonomous vehicle to be operative to perform one or more of: acceleration, deceleration, and stopping.

14. The method of claim 1, wherein the destination position of the first autonomous vehicle is calculated to be the same as a mobile target's position at time T2.

15. The method of claim 1 wherein the tolerance comprises a unit of distance measurement and "tracing the virtually approved pathway on a graphical representation comprising a floorplan of the environment" is replaced with "physically moving a Tag along a desired route and recording a position of the Tag along the desired route".

16. The method of claim 1 wherein the tolerance comprises a numerical designation for position coordinates.

17. The method of claim 1 additionally comprising a step of monitoring a mobile target's position at a time T and adjusting the destination position to be synonymous with the mobile target's position at the time T.

18. The method of claim 17 additionally comprising a step of modifying the waypoints based upon the adjusted destination position.

* * * * *